(12) United States Patent
Saimani et al.

(10) Patent No.: US 10,529,013 B2
(45) Date of Patent: Jan. 7, 2020

(54) IDENTIFYING BUSINESS TYPE USING PUBLIC INFORMATION

(71) Applicants: Jayanth Saimani, Bangalore (IN); Anshu Verma, Bangalore (IN)

(72) Inventors: Jayanth Saimani, Bangalore (IN); Anshu Verma, Bangalore (IN)

(73) Assignee: Intuit Inc., Mountain View, CA (US)

( * ) Notice: Subject to any disclaimer, the term of this patent is extended or adjusted under 35 U.S.C. 154(b) by 530 days.

(21) Appl. No.: 13/956,188

(22) Filed: Jul. 31, 2013

(65) Prior Publication Data

US 2015/0006344 A1    Jan. 1, 2015

(30) Foreign Application Priority Data

Jul. 1, 2013  (IN) .............................. 795/KOL/2013

(51) Int. Cl.
  *G06Q 40/00*    (2012.01)
(52) U.S. Cl.
  CPC .................................... *G06Q 40/00* (2013.01)
(58) Field of Classification Search
  USPC ................... 705/378, 35, 39, 41, 30, 32, 34; 709/204, 206, 202, 7.29, 7.32; 713/100; 715/264; 704/9
  See application file for complete search history.

(56) References Cited

U.S. PATENT DOCUMENTS

| | | | |
|---|---|---|---|
| 6,212,537 B1 | 4/2001 | Nosohara | |
| 6,414,829 B1 | 7/2002 | Haun et al. | |
| 6,504,692 B1 | 1/2003 | Macbeth et al. | |
| 6,601,026 B2 * | 7/2003 | Appelt | G06F 16/3338 704/9 |
| 7,827,027 B2 * | 11/2010 | Wu | G06F 17/271 704/2 |
| 8,185,453 B1 | 5/2012 | Baeck et al. | |

(Continued)

FOREIGN PATENT DOCUMENTS

WO    02-31814 A1    4/2002

OTHER PUBLICATIONS

Chuck Ballard, Amit Gupta, Vijaya Krishnan, Nelson Pessoa, Data Mart Consolidation: Getting Control of Your Enterprise Information, Aug. 2, 2005, An IBM Redbook, IBM Redbook Form No. SG24-6653-00. (Year: 2005).*

(Continued)

*Primary Examiner* — Tien C Nguyen
(74) *Attorney, Agent, or Firm* — Ferguson Braswell Fraser Kubasta PC (57) ABSTRACT

A method for configuring a business management application (BMA) for managing financial aspects of a business entity. The method includes obtaining a business name of an unconfigured user of the BMA, wherein the unconfigured user is associated with the business entity, retrieving, by a computer processor, a search result from an Internet search engine using the business name as a search keyword, analyzing, by the computer processor, the search result to identify a business type of the unconfigured user, and generating, by the computer processor, a configuration setting of the BMA based on the business type, wherein the configuration setting is used by the BMA to generate a customized result specific to the business type.

15 Claims, 9 Drawing Sheets

(56) References Cited

U.S. PATENT DOCUMENTS

| | | | |
|---|---|---|---|
| 8,374,881 B2* | 2/2013 | Bangalore | G06F 17/279 |
| | | | 704/277 |
| 8,412,675 B2* | 4/2013 | Alvarado | G06Q 10/109 |
| | | | 707/616 |
| 8,438,379 B2 | 5/2013 | Hoff et al. | |
| 2003/0101166 A1 | 5/2003 | Uchino et al. | |
| 2007/0005337 A1* | 1/2007 | Mount | G06F 16/35 |
| | | | 704/2 |
| 2011/0125826 A1* | 5/2011 | Erhart | G06Q 10/10 |
| | | | 709/202 |
| 2012/0290330 A1 | 11/2012 | Coleman et al. | |
| 2012/0330721 A1* | 12/2012 | Volpe | G06Q 30/0201 |
| | | | 705/7.32 |
| 2013/0048720 A1* | 2/2013 | Lewis | G06Q 10/00 |
| | | | 235/382 |
| 2013/0218965 A1* | 8/2013 | Abrol | H04L 67/22 |
| | | | 709/204 |
| 2014/0156614 A1* | 6/2014 | Krappe | G06F 21/31 |
| | | | 707/694 |

OTHER PUBLICATIONS

International Search Report for International Application No. PCT/US2013/062620, dated Apr. 16, 2014 (5 pages).
Written Opinion for International Application No. PCT/US2013/062620, dated Apr. 16, 2014 (5 pages).
Canadian Office Action dated May 10, 2016 for Canadian Application No. 2,896,819, 4 pages.
Australian Examination Report dated Mar. 24, 2016 for Australian Application No. 2013393324, 6 pages.

* cited by examiner

ABC Accounting Solution

Screenshot B 400b

Tell us who you are, so we can make it custom built for you

? Help

We think your Company 'Remixto Eateries' is...  ← 402 Business Type

◉ Restaurant Service
○ Event Management Business
○ None of the above

Action Buttons 403

[ Confirm ]   [ Cancel ]

IDENTIFYING BUSINESS TYPE USING PUBLIC INFORMATION

CROSS-REFERENCE TO RELATED APPLICATIONS

This application claims priority, under 35 U.S.C. § 119(a), to Indian Patent Application No. 795/KOL/2013, filed on Jul. 1, 2013, and entitled: "IDENTIFYING BUSINESS TYPE USING PUBLIC INFORMATION."

BACKGROUND

Business management applications (e.g., accounting software, personnel software, payroll software, financial software, contact management software, etc.) are typically user configurable. For example, one or more configuration settings of a business management application may be determined based on user provided inputs, such as business name, business type, geographic location, language, culture related business processes, etc.

SUMMARY

In general, in one aspect, the invention relates to a method for configuring a business management application (BMA) for managing financial aspects of a business entity. The method includes obtaining a business name of an unconfigured user of the BMA, wherein the unconfigured user is associated with the business entity, retrieving, by a computer processor, a search result from an Internet search engine using the business name as a search keyword, analyzing, by the computer processor, the search result to identify a business type of the unconfigured user, and generating, by the computer processor, a configuration setting of the BMA based on the business type, wherein the configuration setting is used by the BMA to generate a customized result specific to the business type.

In general, in one aspect, the invention relates to a system for configuring a business management application (BMA) for managing financial aspects of a business entity. The system includes a processor, memory storing instructions executable by the processor, wherein the instructions include (i) a BMA interface configured to obtain a business name of an unconfigured user of the BMA, and provide a business type of the unconfigured user to the BMA, (ii) a search engine interface configured to retrieve a search result from an Internet search engine using the business name as a search keyword, and (iii) a search result analyzer configured to analyze the search result to identify a business type of the unconfigured user, and generate a configuration setting of the BMA based on the business type, wherein the configuration setting is used by the BMA to generate a customized result specific to the business type, and a repository configured to store the business name, the search result, and the configuration setting.

In general, in one aspect, the invention relates to a non-transitory computer readable medium storing instructions for configuring a business management application (BMA). The instructions, when executed by a computer processor, include functionality for obtaining a business name of an unconfigured user of the BMA, wherein the unconfigured user is associated with the business entity, retrieving a search result from an Internet search engine using the business name as a search keyword, analyzing the search result to identify a business type of the unconfigured user, and generating a configuration setting of the BMA based on the business type, wherein the configuration setting is used by the BMA to generate a customized result specific to the business type.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to configure a business management application (BMA) by automatically determining a business type of an unconfigured user. The unconfigured user is typically a first time user of the BMA prior to registering and configuring the BMA. In one or more embodiments, the business type is determined based on information accessible on Internet regarding the unconfigured user. Such information is referred to as public information. For example, the business type of the unconfigured user may be determined based on search results of an Internet search engine, online social network (OSN) messages, etc. that are associated with the unconfigured user.

Figure 1:
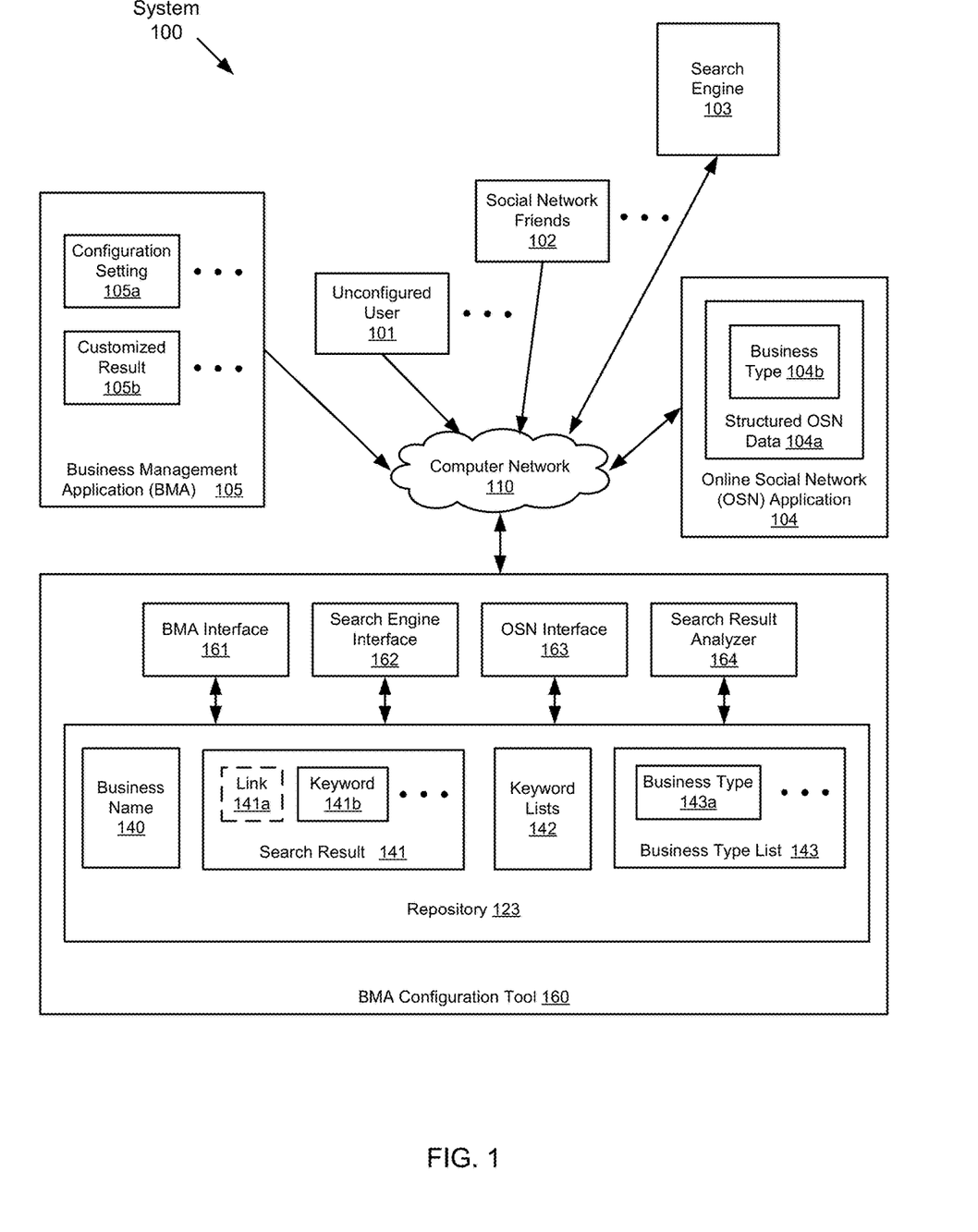
FIG. 1 shows a block diagram of a system in accordance with one or more embodiments of the invention.

FIG. 1 shows a block diagram of a system (100) for identifying business type using public information in accordance with one or more embodiments of the invention. Specifically, the system (100) includes an unconfigured user (101) of a business management application (BMA) (105), an online social network (OSN) application (104), social network friends (102) of the unconfigured user (101) based on the OSN application (106), a search engine (103), and a BMA configuration tool (160). In addition, these elements of the system (100) are coupled via a computer network (110). In one or more embodiments of the invention, the BMA configuration tool (160), or a portion thereof, may be integrated with the BMA (105). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is coupled to or overlaps with the Internet.

In one or more embodiments, each unconfigured user (101), the social network friends (102), the search engine (103), the OSN application (104), and the BMA configuration tool (160) may include any computing device configured with computing, data storage, and network communication functionalities. Generally, the unconfigured user (101) is among multiple users of the BMA (105). In particular, the unconfigured user (101) may be a business owner, an employee, or other person associated with a business entity using the BMA (105) to manage business activities of the business entity. For example, the business activities may include accounting activities, personnel activities, payroll activities, etc. among various activities of financial aspects. In one or more embodiments, the BMA (105) requires a user registration procedure to obtain user specific information for configuring the BMA (105). As noted above, the unconfigured user is typically a first time user of the BMA prior to registering and configuring the BMA (105).

In one or more embodiments, the BMA (105) may be an accounting application, a payroll application, a personnel application, or any business management application. In one or more embodiments, the BMA (105) is provided by an application service provider, such as a software as a service (SaaS) provider. For example, the BMA (105) may be a SaaS accessed by the unconfigured user (101) among multiple users on a subscription basis. In one or more embodiments, configuration settings (e.g., configuration setting (105a)) of the unconfigured user (101) are used by the BMA (105) to provide customized results (e.g., customized result (105b)) to the unconfigured user (101). For example, the configuration setting (105a) may include a list of enabled functional modules, a chart of accounts, an invoice setting, a sales receipt setting, a workflow setting, etc. specified by the unconfigured user (101) to customize the BMA (105). Correspondingly, the customized result (105b) may include an output of one or more enabled functional modules, an account status report, an invoice, a sales receipt, a workflow result, etc. generated by the BMA (105) based on the configuration setting (105a). In one or more embodiments, the configuration setting (105a) is determined based on a business type, a geographic region, a language, a currency, a tax code, etc. of the unconfigured user (101). Although the configuration setting (105a) and the customized result (105b) are shown in FIG. 1 as stored within the BMA (105), in one or more embodiments, the configuration setting (105a) and/or the customized result (105b) may not persist within the BMA (105). In such embodiments, the configuration setting (105a) may be stored in the repository (123) and retrieved by the BMA (105) as needed to generate the customized result (105b) that is also stored in the repository (123). The repository (123) may include a disk drive storage device, a semiconductor storage device, other suitable computer data storage device, or combinations thereof.

In one or more embodiments, the unconfigured user (101) and social network friends (105) are members (e.g., an individual, a person) of one or more social networks, which are configured to allow their users to establish "friend" relationships and exchange information (e.g., sending messages, posting comments, etc.) among such social network "friends". Specifically, a social network is a social structure (e.g., community) made of members (e.g., a person or a user) connected by social relationships such as friendship, kinship, relationships of beliefs, knowledge, prestige, culture, etc. In one or more embodiments, the OSN application (104) form the basis of computer mediated social interaction and networking within a social network community where the unconfigured user (101) and the social network friends (102) are members. In particular, the OSN application (104) is message based and provides a variety of ways (e.g., e-mail, instant messaging service, etc.) for the unconfigured user (101) and the social network friends (102) to interact socially via social network messages. Throughout this disclosure, the terms "social network" and "online social network" may be used interchangeably and refer to a computer mediated social network having computer servers to facilitate social interaction among members of the social network. Examples of computer mediated social network application include those provided by Facebook® (a registered trademark of Facebook, Inc., Palo Alto, Calif.), Myspace® (a registered trademark of Myspace, Inc., Beverly Hills, Calif.), Twitter® (a registered trademark of Twitter, Inc., San Francisco, Calif.), LinkedIn® (a registered trademark of LinkedIn, Ltd., Mountain View, Calif.), etc. Certain social network services provide application programming interfaces (APIs) allowing programmatic retrieval of social network messages by third party developers.

In one or more embodiments, the search engine (103) includes a software system configured to search for information on the Internet. For example, the search engine (103) retrieves information from the World Wide Web (commonly known as the web) based on a search keyword. As is known to those skilled in the art, the World Wide Web is a system of interlinked hypertext documents accessed via the Internet.

As shown in FIG. 1, the BMA configuration tool (160) includes a BMA interface (161), a search engine interface (162), an OSN interface (163), a search result analyzer (164), and a repository (123) storing information used and/or generated by these elements of the BMA configuration tool (160). Each of these elements of the BMA configuration tool (160) is described in detail below.

In one or more embodiments, the BMA interface (161) is configured to obtain a business name of the unconfigured user (101) and provide a business type of the unconfigured user (101) to the BMA (105). In particular, the obtained business name is stored in the repository (123) as the business name (140) and the provided business type may be one selected from the business type list (143), such as the business type (143a). Examples of obtaining the business name and providing the business type are described in reference to FIGS. 4A-4C below.

In one or more embodiments, the search engine interface (162) is configured to retrieve a search result (141) from the search engine (103) using the business name (140) as a search keyword. In particular, the search result (141) is stored in the repository (123) and may include unstructured text descriptions related to the business name (140). In one or more embodiments, the unstructured text descriptions may include one or more keywords, such as the keyword (141b). In addition, the search result (141) may further include one or more hyperlinks, such as the link (141a).

In one or more embodiments, the search result analyzer (164) is configured to analyze the search result (141) to identify a business type (e.g., business type (104b), business type (143a)) of the unconfigured user (101). In one or more embodiments, the search result (141) is related to the OSN application (104) used by the unconfigured user (101) to exchange social interaction messages with social network friends (102) of the unconfigured user (101). For example, the search result (141) includes the link (141a) associated with the OSN application (104). Accordingly, analyzing the search result (141) by the search result analyzer (164) includes identifying the OSN application (104) from the search result (141) and accessing OSN data based on the link (141a). In one or more embodiments, the OSN data is structured, such as the structured OSN data (104b) accessible using the OSN application (104). For example, the structured OSN data (104a) may be an OSN home page or an OSN user profile associated with the business name (140). Examples of identifying the OSN application (104) and accessing the structured OSN data (104a) are described in reference to FIGS. 3A and 3B below.

In one or more embodiments, the OSN home page or the OSN user profile associated with the business name (140) includes a business type field for describing a business entity associated with the business name (140). For example, the structured OSN data (104a) may include the business type (104b) as content of such business type field. In one or more embodiments, in response to identifying the OSN application (104) and accessing the structured OSN data (104a), the OSN interface (163) is configured to retrieve, using an application programming interface of the OSN application (104), the business type (104b) from the structured OSN data (104a) based on a pre-determined format of the structured OSN data (104a). Accordingly, the business type (104b) retrieved from the structured OSN data (104a) is assigned to the business name (140). Examples of retrieving the business type (104b) from the structured OSN data (104a) for assigning to the business name (140) are described in reference to FIGS. 3A and 3B below.

In one or more embodiments, in addition to the aforementioned analysis based on the OSN application (104) associated with the business name (140), the search result (141) is further analyzed by the search result analyzer (164) based on keyword matching. In one or more embodiments, regardless of any OSN application (e.g., the OSN application (104)) associated with the business name (140), the search result (141) is analyzed by the search result analyzer (164) based on the keyword matching. In either scenario, the search result analyzer (164) is configured to match the search result (141) to one of a number of pre-determined keyword lists, where each of the pre-determined keyword lists corresponds to one of a number of business types.

Specifically, the number of pre-determined keyword lists is stored in the repository (123) as the keyword lists (142) and the number of business types is stored in the repository (123) as the business type list (143). For example, the search result (141) may be matched to a selected keyword list from the keyword lists (142) that corresponds to the business type (143a). In one or more embodiments, such matching is based on a pre-determined similarity measure dependent on how many matching keywords are found in both the search result (141) and the selected keyword list.

In one or more embodiments, the selected keyword list includes the highest number of matching keywords with the search result (141) comparing to any other keyword list in the keyword lists (142). Accordingly, the business type (143a) that corresponds to the selected keyword list (i.e., selected based on the matching) is assigned to the business name (140). Examples of identifying the business type (143a) for assigning to the business name (140) based on search result keyword matching are described in reference to FIG. 3C below.

In one or more embodiments, at least a portion of the text descriptions in the search result (141) is in a different language than the language of the keyword lists (142). In such embodiments, the search result analyzer (164) is further configured to identify the initial language of the search result (141) and translate the search result (141) into the same language as the keyword lists (142) for performing the aforementioned matching operation.

In one or more embodiments, the search result analyzer (164) is further configured to generate the configuration setting (105a) of the BMA (105) based on the assigned business type (e.g., business type (104b), business type (143a)). In particular, the configuration setting (105a) is used by the BMA (105) to generate a customized result (105b) specific to the business type (143a). In one or more embodiments, the configuration setting (105a) is determined based on what other users of the same business type specify in their respective configuration settings. For example, the configuration setting (105a) relates to a list of enabled functional modules, a chart of accounts, an invoice setting, a sales receipt setting, a workflow setting, etc. that are determined based on those specified by a majority of other users of the same business type. In one or more embodiments, the customized result (105b) may include an output of one or more enabled functional modules, an account status report, an invoice, a sales receipt, a workflow result, etc. generated by the BMA (105) based on the configuration setting (105a). In one or more embodiments, the customized result (105b) is presented by the BMA (105) to the unconfigured user (101) and/or the business entity associated with the unconfigured user (101). An example of generating the configuration setting (105a) for the unconfigured user (101) based on other users of the same business type is described in reference to FIGS. 4A-4C below.

Figure 2:
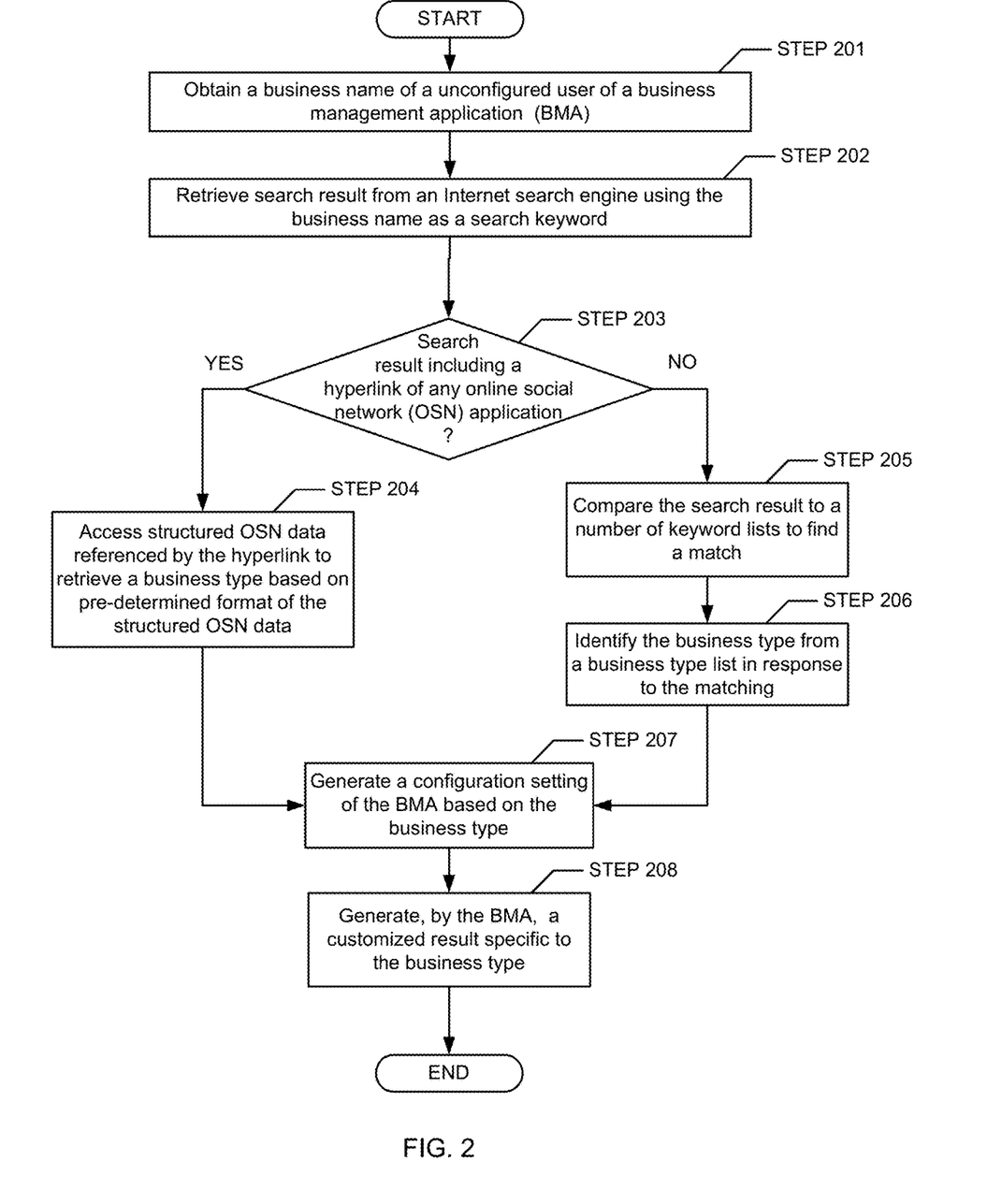
FIG. 2 shows a flow chart of a method in accordance with one or more embodiments of the invention.

FIG. 2 shows a flow chart for identifying a business type using public information in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially in Step 201, a business name of an unconfigured user of a business management application (BMA) is obtained. In particular, the BMA is used by a business entity associated with the unconfigured user for managing financial aspects of a business entity, such as accounting activities, personnel activities, payroll activities, etc. For example, the BMA may be an accounting application, a payroll application, a personnel application, etc. Generally, the unconfigured user is among multiple users of the BMA. In particular, the unconfigured user may be a business owner, an employee, or other person associated with the business entity. In one or more embodiments, the BMA requires a user registration procedure to obtain user specific information for configuring the BMA. For example, the unconfigured user is typically a first time user of the BMA prior to registering and configuring the BMA. An example of obtaining the business name of the unconfigured user is described in reference to FIG. 4A below.

In Step 202, a search result is retrieved from an Internet search engine using the business name as a search keyword. For example, the Internet search engine may be one or more of the search engines provided by Google Inc. (Mountain View, Calif.), Microsoft Inc. (Redmond, Wash.), Yahoo Inc. (Sunnyvale, Calif.), etc. In particular, the search result may include unstructured text descriptions related to the business name obtained in Step 201. In one or more embodiments, the unstructured text descriptions may include one or more keywords. In addition, the search result may further include one or more hyperlinks.

Through the following Steps 203 through 206 analyzing, the search result is analyzed to identify a business type of the unconfigured user. Specifically, in Step 203, a determination is made as to whether the search result includes a hyperlink of any online social network (OSN) application. If the determination is positive, i.e., the search result includes at least one hyperlink of an OSN application, the method proceeds to Step 204.

In Step 204, the hyperlink is used to access OSN data of the OSN application. In one or more embodiments, the accessed OSN data has a pre-determined structure and is referred to as structured OSN data. In one or more embodiments, the structured OSN data may be an OSN home page or an OSN user profile associated with the business name. For example, the OSN home page may be posted by a business entity associated with the business name, and the OSN user profile may belong to an employee of the business entity. In one or more embodiments, the structured OSN data (e.g., the OSN home page or the OSN user profile) includes a business type field for describing business activities that the business entity engages in. Accordingly, the content of this business type field is extracted as the business type to be assigned to the business name, and the method continues to Step 207. Examples of retracting the business type from the structured OSN data for assigning to the business name are described in reference to FIGS. 3A and 3B below.

Returning to the discussion of Step 203, if the determination in Step 203 is negative, i.e., the search result does not include at least one hyperlink of any OSN application, the method proceeds to Step 205.

In Step 205, the search result is compared to a number of pre-determined keyword lists to find a match. Each of the pre-determined keyword lists corresponds to one of a number of business types. In one or more embodiments, the search result is matched to a selected keyword list from the pre-determined keyword lists that correspond to a particular one of the business types. In one or more embodiments, such matching is based on a pre-determined similarity measure dependent on how many matching keywords are found in both the search result and the selected keyword list. In one or more embodiments, the selected keyword list includes the highest number of matching keywords with the search result comparing to any other keyword list in the pre-determined keyword lists. Accordingly, in Step 206, the particular business type that corresponds to the selected keyword list (i.e., selected based on the matching) is assigned to the business name and the method proceeds to Step 207. Examples of identifying the business type for assigning to the business name based on search result keyword matching are described in reference to FIG. 3C below.

In one or more embodiments, at least a portion of the text descriptions in the search result is in a different language than the language of the pre-determined keyword lists. In such embodiments, the search result is first translated into the same language as the pre-determined keyword lists for performing the aforementioned matching operation.

In Step 207, a configuration setting of the BMA is generated based on the assigned business type. In one or more embodiments, the configuration setting is determined based on what other users of the same business type specify in their respective configuration settings. For example, the configuration setting relates to a list of enabled functional modules, a chart of accounts, an invoice setting, a sales receipt setting, a workflow setting, etc. that are determined based on those specified by a majority of other users of the same business type.

In Step 208, the configuration setting is used by the BMA to generate a customized result specific to the business type. In one or more embodiments, the customized result may include an output of one or more enabled functional modules, an account status report, an invoice, a sales receipt, a workflow result, etc. generated by the BMA based on the configuration setting. In one or more embodiments, the customized result is presented by the BMA to the unconfigured user and/or the business entity associated with the unconfigured user. An example of generating the configuration setting for the unconfigured user based on other users of the same business type is described in reference to FIGS. 4A-4C below.

FIGS. 3A-3C and 4A-4C show an application example in accordance with one or more embodiments of the invention. This application example may be practiced using the system (100) of FIG. 1 and based on the method described with respect to FIG. 2 above. Although FIGS. 3A-3C and 4A-4C show implementation examples of embodiments of the invention, those skilled in the art will appreciate that there may be other ways in which to implement embodiments of the invention, and that the example screenshots are not meant to limit the scope of the invention.

Figure 3A:
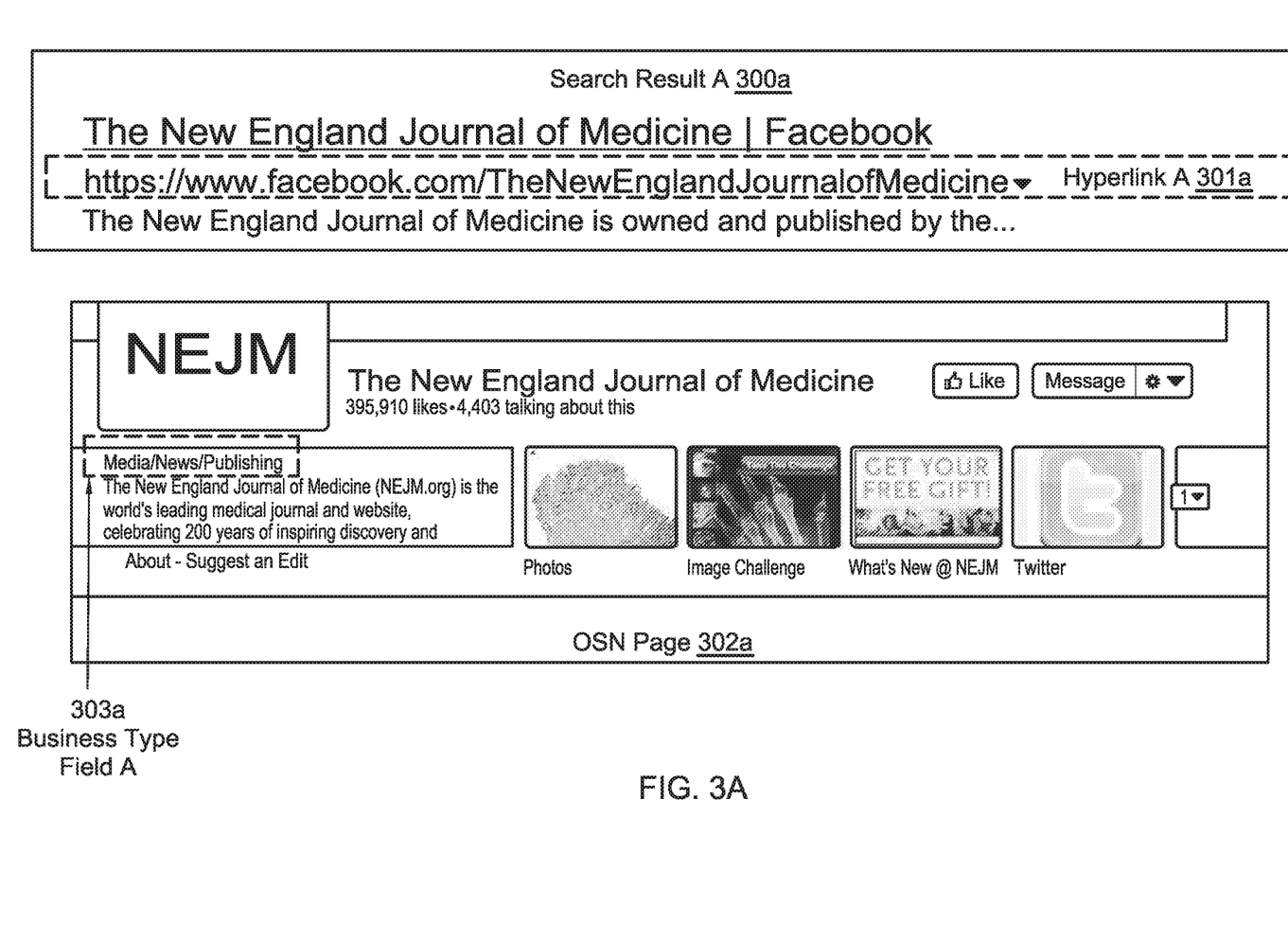
FIGS. 3A, 3B, and 3C show an example in accordance with one or more embodiments of the invention.
Figure 3B:
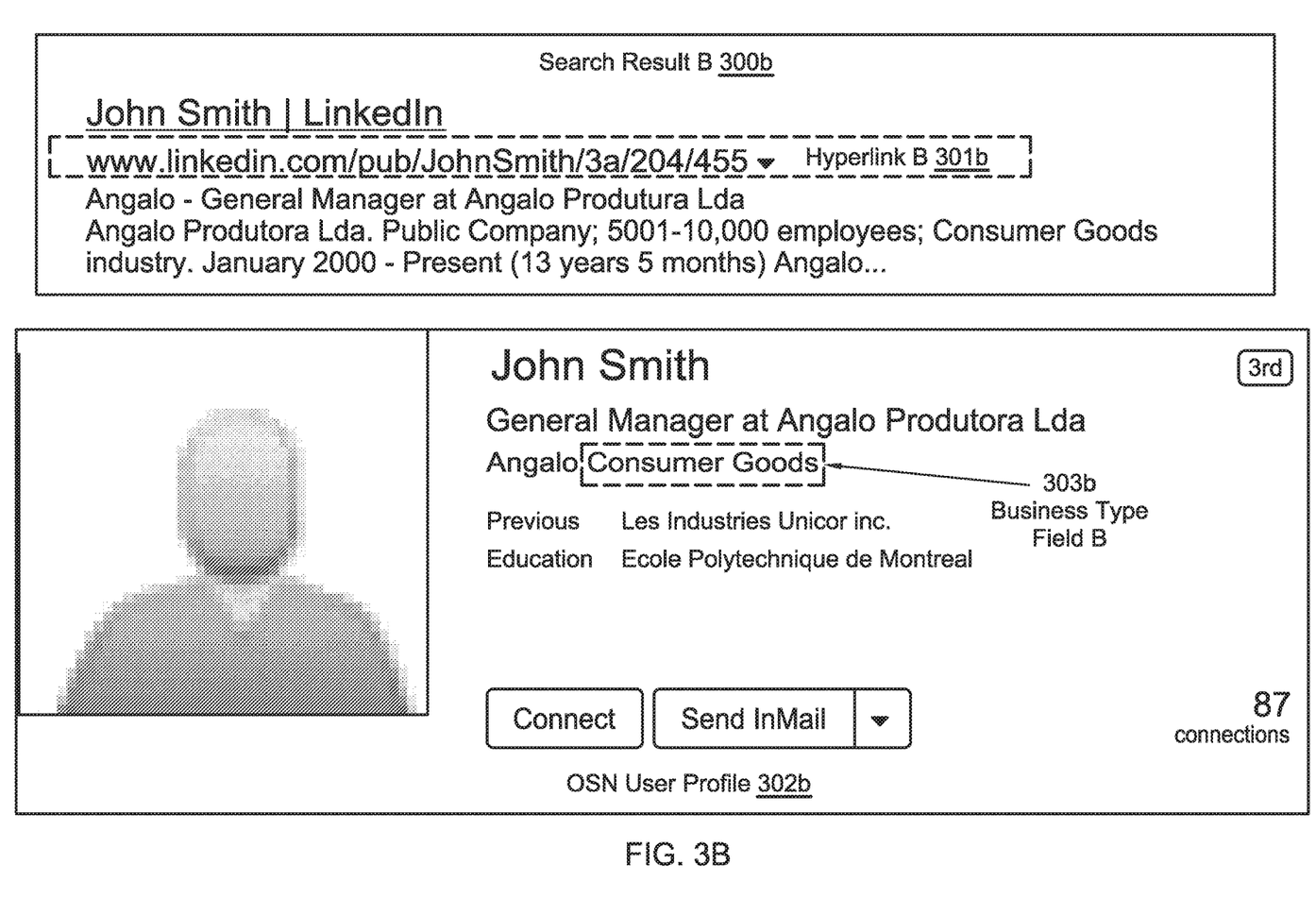
Figure 3C:
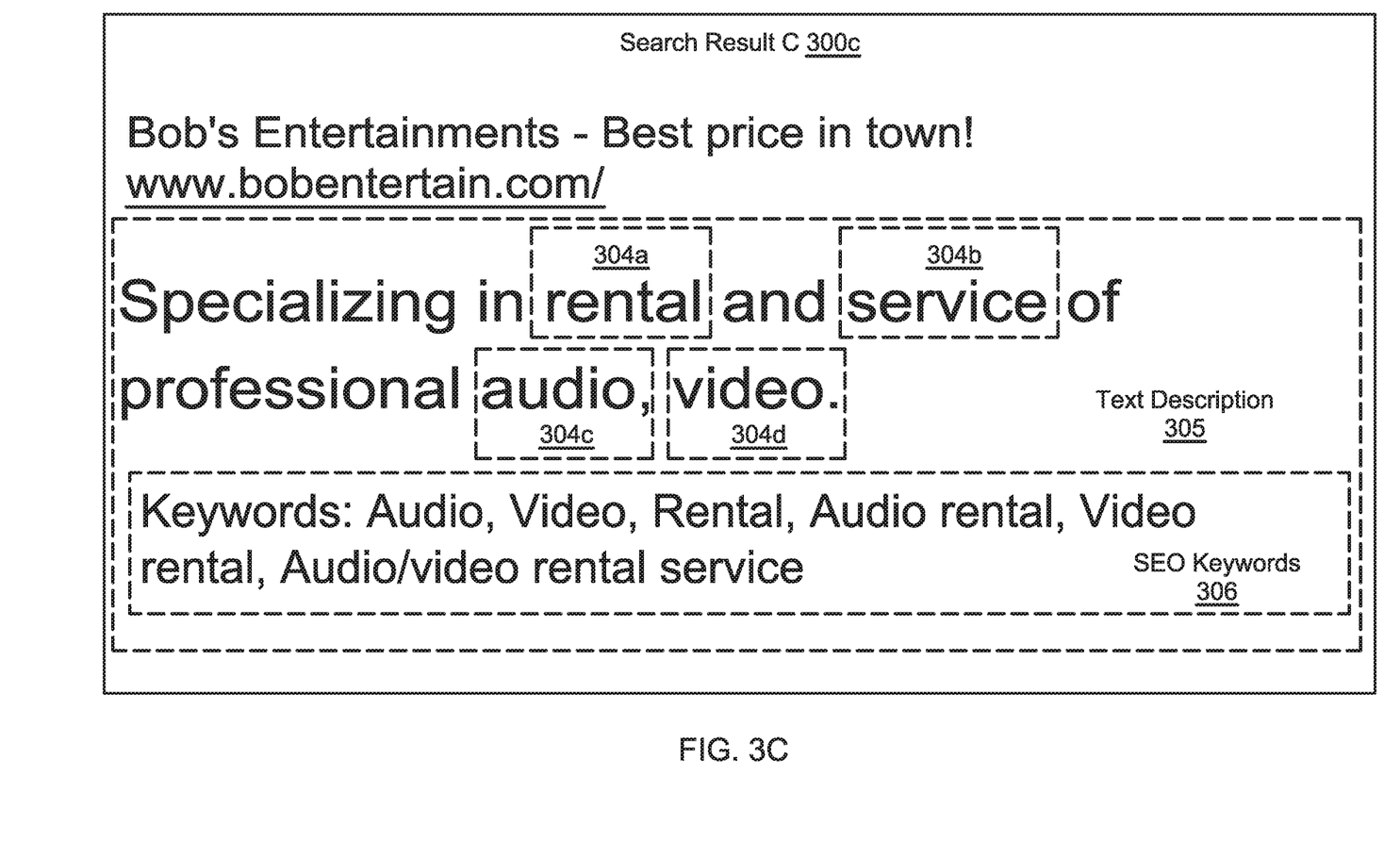

FIGS. 3A-3C shows examples of search engine results in accordance with one or more embodiments of the invention. Each of these examples is described in detail below.

FIG. 3A shows an example search result A (300a) generated by an Internet search engine using a business name "New England Journal of Medicine" as the search keyword. In particular, the search result A (300a) includes a hyperlink A (301a) in addition to text descriptions.

Although the search result A (300a) is depicted in a human readable format in FIG. 3A, the search result A (300a) may also be obtained in a machine readable and structured format using an API of the Internet search engine. Accordingly, the hyperlink A (301a) is retrieved from the search result A (300a) based on the pre-determined structured format defined by the API of the search engine. In the example shown in FIG. 3A, the hyperlink A (301a) references an OSN page (302a) of the "New England Journal of Medicine." Accordingly, the OSN page (302a) is retrieved using the hyperlink A (301a).

Although the OSN page (302a) is depicted in a human readable format in FIG. 3A, the OSN page (302a) may also be obtained in a machine readable and structured format using an API of the OSN application. For example, the pre-determined structured format defined by the API of the OSN application may include a business type field A (303a). Accordingly, the content of the business type field A (303a) is retrieved from the OSN page (302a) based on the pre-determined structured format defined by the API of the OSN application. In particular, the content of the business type field A (303a) indicates that the business name "New England Journal of Medicine" is associated with the business type of "media/news/publishing." Accordingly, the business type "media/news/publishing" is assigned to the business name "New England Journal of Medicine." In the example shown in FIG. 3A, the OSN application is provided by Facebook® (a registered trademark of Facebook, Inc., Palo Alto, Calif.), and the content of the business type field A (303a) is retrieved using a graph API call supported by the Facebook® API.

FIG. 3B shows an example search result B (300b) generated by an Internet search engine using a business name "Angalo Productora Lda" as the search keyword. In particular, the search result B (300b) includes a hyperlink B (301b) in addition to text descriptions.

Although the search result B (300b) is depicted in a human readable format in FIG. 3B, the search result B (300b) may also be obtained in a machine readable and structured format using an API of the Internet search engine. Accordingly, the hyperlink B (301b) is retrieved from the search result B (300b) based on the pre-determined structured format defined by the API of the search engine. In the example shown in FIG. 3B, the hyperlink B (301b) references an OSN user profile (302b) of an employee "John Smith" of "Angalo Productora Lda." Accordingly, the OSN user profile (302b) is retrieved using the hyperlink B (301b).

Although the OSN user profile (302b) is depicted in a human readable format in FIG. 3B, the OSN user profile (302b) may also be obtained in a machine readable and structured format using an API of the OSN application. For example, the pre-determined structured format defined by the API of the OSN application may include a business type field B (303b). Accordingly, the content of the business type field B (303b) is retrieved from the OSN user profile (302b) based on the pre-determined structured format defined by the API of the OSN application. In particular, the content of the business type field B (303b) indicates that the business name "Angalo Productora Lda" is associated with the business type of "consumer goods." Accordingly, the business type "consumer goods" is assigned to the business name "Angalo Productora Lda." In the example shown in FIG. 3B, the OSN application is provided by LinkedIn (a registered trademark of LinkedIn, Ltd., Mountain View, Calif.), and the content of the business type field B (303b) is retrieved using a people search query supported by the LinkedIn® API.

FIG. 3C shows an example search result C (300c) generated by an Internet search engine using a business name "Bob's Entertainments" as the search keyword. In particular, the search result C (300c) includes free form text description (305) that describes "Bob's Entertainments." Further, the text description (305) includes various keywords, such as keywords (304a) through (304d) used to describe "Bob's Entertainments" and the SEO keywords (306) that are embedded in the text description (305) to improve search result ranking. As noted above, the text description (305) is compared to various keyword lists corresponding to various business types. For example, the keyword list for the business type "media rental service" contains the keywords "audio", "video", "DVD", "music", "rental", etc. and is matched to the keywords (304a) through (304d) and the SEO keywords (306). Accordingly, "media rental service" is selected as the business type of "Bob's entertainment."

Figure 4A:
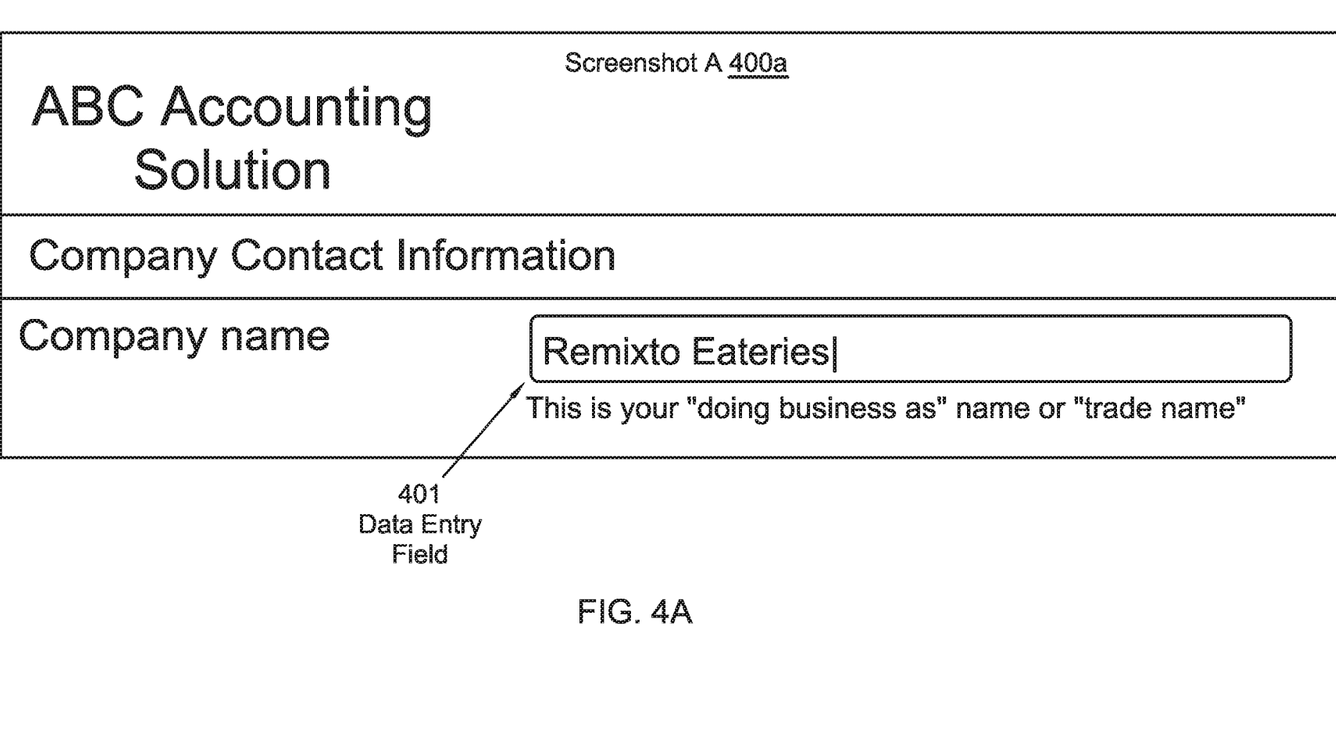
FIGS. 4A, 4B, and 4C show an example in accordance with one or more embodiments of the invention.
Figure 4B:
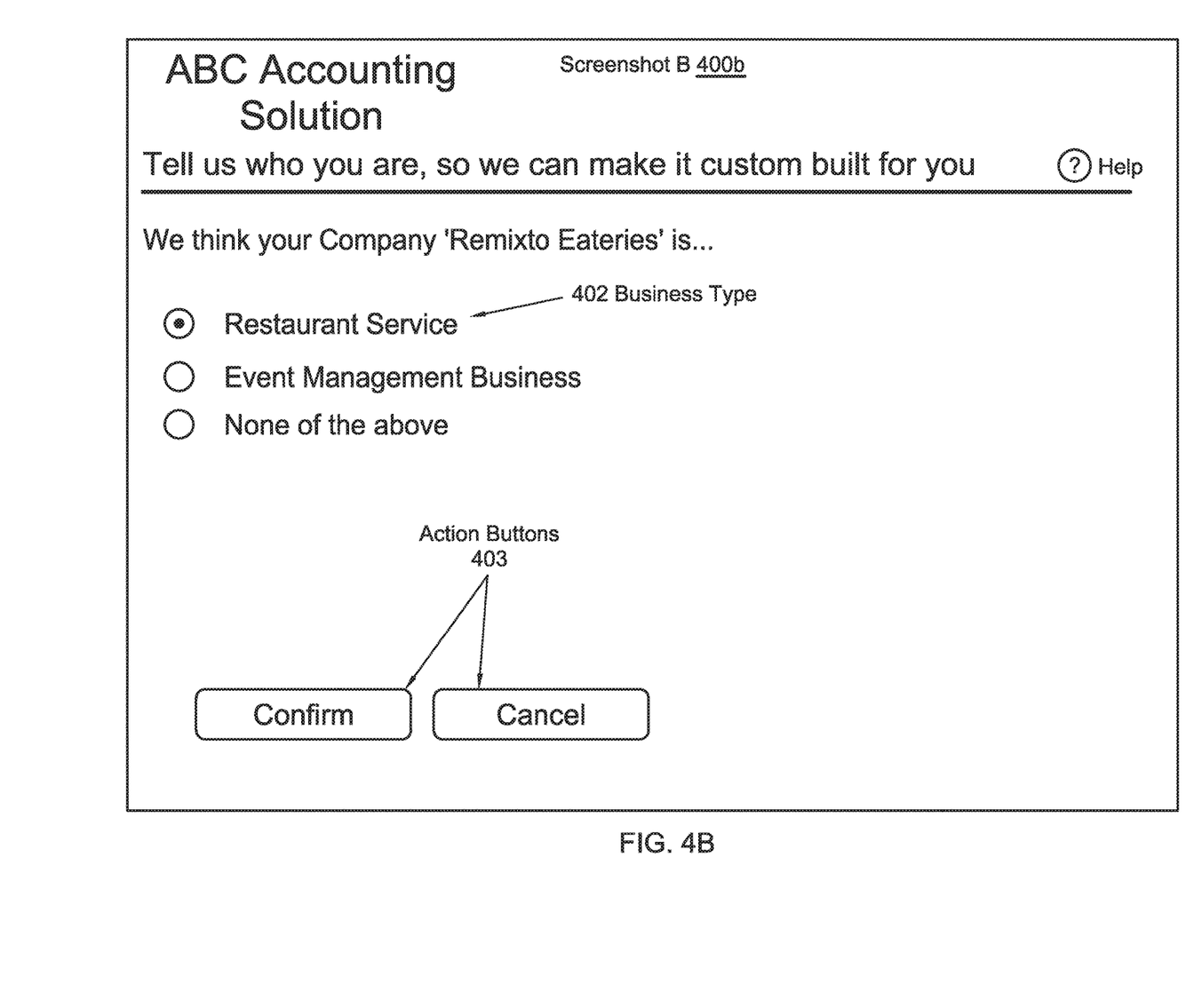
Figure 4C:
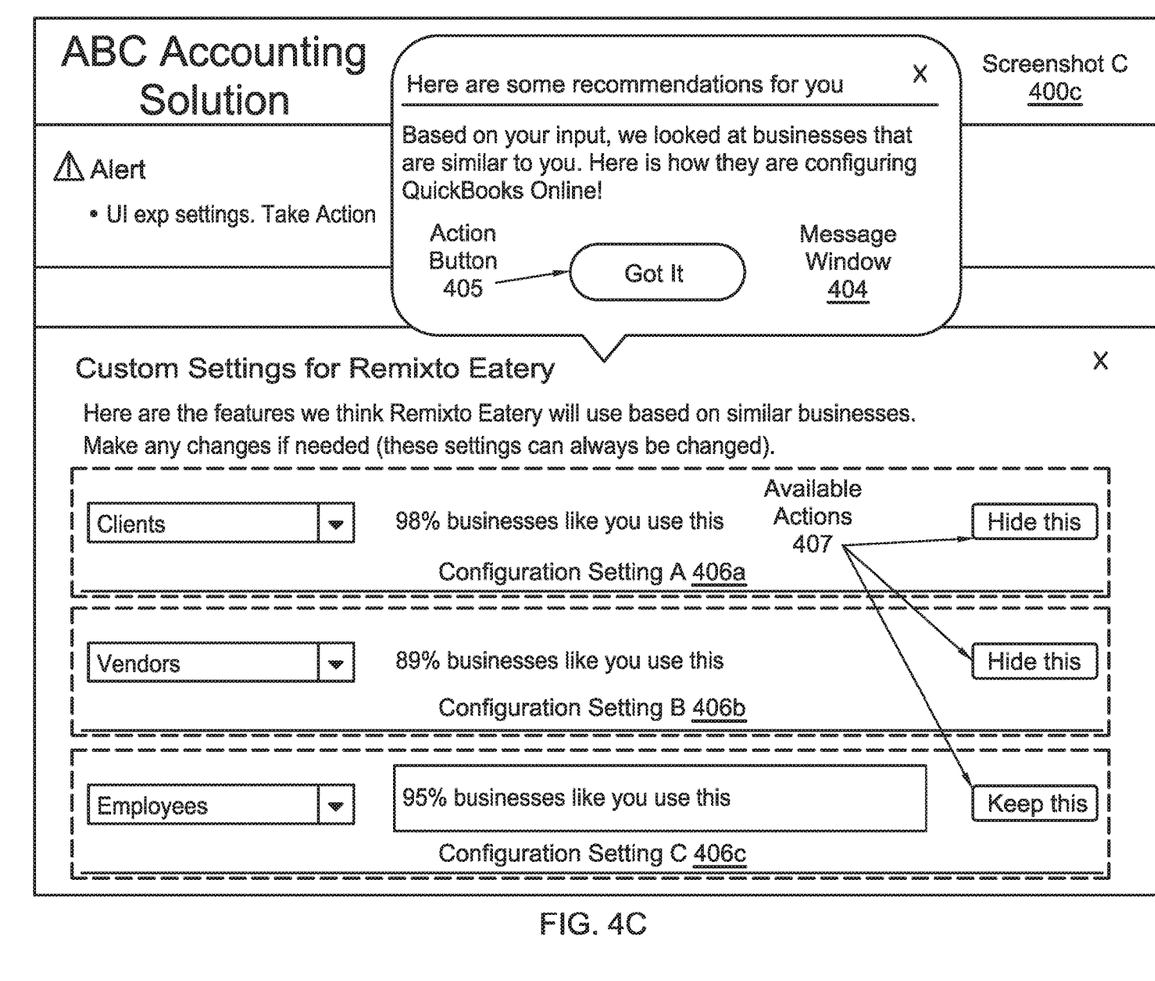

FIGS. 4A-4C shows unconfigured user registration screenshots of an example business management application (BMA) in accordance with one or more embodiments of the invention. In particular, the BMA configuration tool described in reference to FIG. 1 above is integrated with the BMA in the example shown in FIGS. 4A-4C. Each of these example screenshots is described in detail below.

FIG. 4A shows an example screenshot A (400a) of the example BMA "ABC Accounting Solution." Specifically, the screenshot A (400a) depicts a user registration page in a graphical user interface (GUI) of "ABC Accounting Solution." As shown in FIG. 4A, a unconfigured user enters a business name "Remixto Eateries" into the data entry field (401) of the user registration page during a registration process before the unconfigured user can start using "ABC Accounting Solution" to manage accounting activities of the business entity "Remixto Eateries." Once the business name "Remixto Eateries" is entered into the data entry field (401), the BMA configuration tool embedded in "ABC Accounting Solution" automatically obtains and analyzes Internet search results using "Remixto Eateries" as the search keyword to determine that the business type of "Remixto Eateries" is a "restaurant service." For example, the business type may be determined from the search result as described in the examples shown in FIGS. 3A-3C above. Because the business type specified by the OSN application may not use the same terminology and/or the same language as BMA configuration tool, a mapping/translation may be performed to translate the business type specified by the OSN application into the same terminology and/or same language used by the BMA configuration tool. In response to determining (with optional mapping/translation) the business type, the unconfigured user is directed to the next GUI page shown in FIG. 4B below.

FIG. 4B shows an example screenshot B (400b) of "ABC Accounting Solution." Specifically, the screenshot B (400b) depicts a message window requesting the unconfigured user to confirm the business type of "Remixto Eateries." As shown in FIG. 4B, the automatically determined business type (402) "restaurant service" is presented to the unconfigured user for confirmation. If the unconfigured user agrees with the automatically determined business type (402) "restaurant service," the unconfigured user then uses the action button (403) to proceeds to the next GUI page shown in FIG. 4C below. If the unconfigured user disagrees, the unconfigured user then uses the action button (403) to cancel the automatically determined business type (402) "restaurant service." In one or more embodiments, the algorithms used to determine business type by analyzing the search result is adjusted based on whether the unconfigured user agrees or disagrees with the automatically determined business type (402). For example, a machine learning algorithm may be used to improve the accuracy of the automatic determination of business type.

FIG. 4C shows an example screenshot C (400c) of "ABC Accounting Solution." Specifically, the screenshot C (400c) depicts a configuration setting window showing the automatically generated configuration setting A (406a), configuration setting B (406b), and configuration setting C (406c). In particular, these automatically generated configuration settings are determined by the BMA configuration tool embedded in "ABC Accounting Solution" based on the automatically determined business type (402) "restaurant service" in FIG. 4B. Specifically, as indicated by the available actions (407), the automatically generated configuration setting A (406a) enables the client module of "ABC Accounting Solution" based on what 98% of users of business type "restaurant service" chose to do. Similarly, the automatically generated configuration setting B (406b) enables the vendor module of "ABC Accounting Solution" based on what 89% of users of business type "restaurant service" chose to do. In contrast, the automatically generated configuration setting C (406c) disables the employee module of "ABC Accounting Solution" based on what 95% of users of business type "restaurant service" chose to do. In addition, the message window (404) informs the unconfigured user how these configuration settings are automatically generated. Accordingly, the unconfigured user may accept these automatically generated configuration settings using the action button (405). Otherwise, the unconfigured user may override the automatically generated configuration settings using the available actions (407). Although the example screenshot C (400c) is shown as a result of the previous screenshot B (400b), in other examples, the "ABC Accounting Solution" may be configured to skip the message window shown in FIG. 4B above. In other words, the "ABC Accounting Solution" may be configured to directly present the automatically generated configuration settings (shown in FIG. 4C) without first requesting the unconfigured user to confirm the automatically determined business type. In such example, the action button (405) may also include a cancel button allowing the unconfigured user to configure "ABC Accounting Solution" manually.

Figure 5:
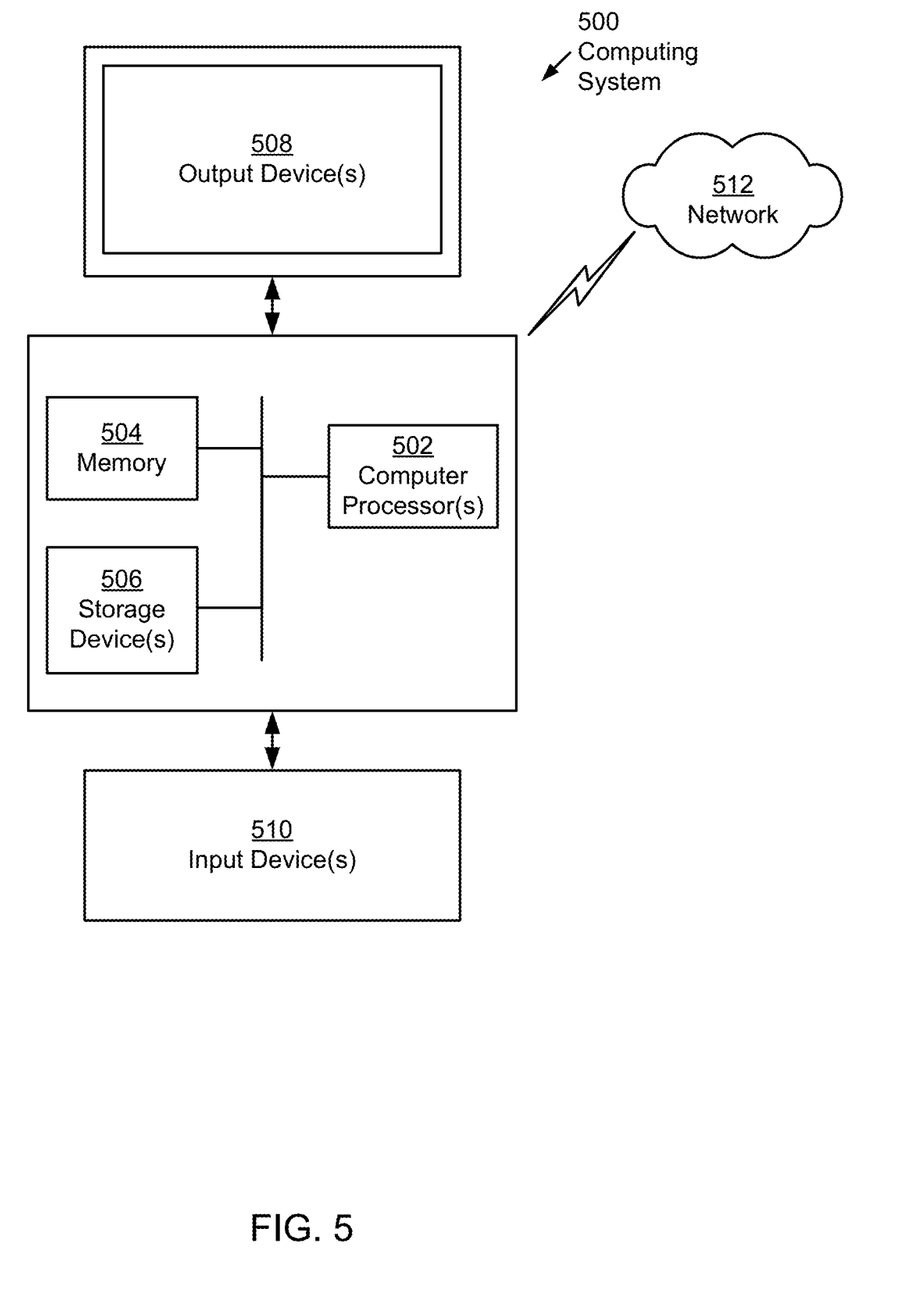
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a business management application (BMA) for managing financial aspects of a business entity, comprising:
    obtaining a business name of an unconfigured user of the BMA, wherein the unconfigured user is associated with the business entity;
    retrieving, by a computer processor, a search result from an Internet search engine using the business name as a search keyword;
    translating, by the computer processor, the search result from a first language into a second language;
    analyzing, by the computer processor, the search result to identify a business type of the unconfigured user by:
        determining that the search result includes a hyperlink to a page of an online social network used by the unconfigured user,
        in response to determining that the search result includes the hyperlink to the page of the online social network, retrieving, utilizing an application programming interface that is associated with the online social network, content from a field of structured data of the page based on a pre-determined format of the structured data, wherein the retrieved content include the business type of the unconfigured user, and
        extracting the business type from the retrieved content; and
    generating, by the computer processor, a configuration setting enabling a module of the BMA based on the business type, wherein the configuration setting is used by the BMA to generate a customized result specific to the business type;
    presenting, in response to generating the configuration setting, a message confirming the module is enabled.

2. The method of claim 1,
    wherein the BMA comprises at least one selected from a group consisting of an accounting application, a payroll application, and a personnel application.

3. The method of claim 1,
    wherein the configuration setting relates to at least one selected from a group consisting of a business workflow and a business document, and
    wherein the customized result is presented by the BMA to the business entity.

4. The method of claim 1,
    wherein the online social network is used by the unconfigured user to exchange social interaction messages with online social network friends of the unconfigured user.

5. The method of claim 1, wherein analyzing the search result comprises:
    matching the search result to one of a plurality of pre-determined keyword lists, wherein the search result comprises textual description of the unconfigured user, and wherein the plurality of pre-determined keyword lists correspond to a plurality of business types; and identifying the business type from the plurality of business types in response to the matching.

6. A system for configuring a business management application (BMA) for managing financial aspects of a business entity, comprising:
a processor;
memory storing instructions executable by the processor, wherein the instructions comprise:
  a BMA interface configured to:
    obtain a business name of a unconfigured user of the BMA;
    provide a business type of the unconfigured user to the BMA; and
    present a message confirming a module of the BMA is enabled based on the business type;
  a search engine interface configured to:
    retrieve a search result from an Internet search engine using the business name as a search keyword; and
  a search result analyzer configured to:
    translate the search result from a first language into a second language;
    analyze the search result to identify the business type of the unconfigured user by:
      determining that the search result includes a hyperlink to a page of an online social network used by the unconfigured user,
      in response to determining that the search result includes the hyperlink to the page of the online social network, retrieving, utilizing an application programming interface that is associated with the online social network, content from a field of structured data of the page based on a pre-determined format of the structured data, wherein the retrieved content include the business type of the unconfigured user, and
      extracting the business type from the retrieved content; and
    generate a configuration setting enabling the module of the BMA based on the business type, wherein the configuration setting is used by the BMA to generate a customized result specific to the business type; and
  a repository configured to store the business name, the search result, and the configuration setting.

7. The system of claim 6,
wherein the BMA comprises at least one selected from a group consisting of an accounting application, a payroll application, and a personnel application.

8. The system of claim 6,
wherein the configuration setting relates to at least one selected from a group consisting of a business workflow and a business document, and
wherein the customized result is presented by the BMA to the business entity.

9. The system of claim 6,
wherein the online social network is used by the unconfigured user to exchange social interaction messages with online social network friends of the unconfigured user.

10. The system of claim 6, wherein analyzing the search result comprises:
matching the search result to one of a plurality of pre-determined keyword lists, wherein the search result comprises textual description of the unconfigured user, and wherein the plurality of pre-determined keyword lists correspond to a plurality of business types; and
identifying the business type from the plurality of business types in response to the matching.

11. A non-transitory computer readable medium storing instructions for configuring a business management application (BMA), the instructions, when executed by a computer processor, comprising functionality for:
obtaining a business name of an unconfigured user of the BMA, wherein the unconfigured user is associated with the business entity;
retrieving a search result from an Internet search engine using the business name as a search keyword;
translating the search result from a first language into a second language;
analyzing the search result to identify a business type of the unconfigured user by:
  determining that the search result includes a hyperlink to a page of an online social network used by the unconfigured user,
  in response to determining that the search result includes the hyperlink to the page of the online social network, retrieving, utilizing an application programming interface that is associated with the online social network, content from a field of structured data of the page based on a pre-determined format of the structured data, wherein the retrieved content include the business type of the unconfigured user, and
  extracting the business type from the retrieved content; and
generating a configuration setting enabling a module of the BMA based on the business type, wherein the configuration setting is used by the BMA to generate a customized result specific to the business type;
presenting, in response to generating the configuration setting, a message confirming the module is enabled.

12. The non-transitory computer readable medium of claim 11,
wherein the BMA comprises at least one selected from a group consisting of an accounting application, a payroll application, and a personnel application.

13. The non-transitory computer readable medium of claim 11,
wherein the configuration setting relates to at least one selected from a group consisting of a business workflow and a business document, and
wherein the customized result is presented by the BMA to the business entity.

14. The non-transitory computer readable medium of claim 11,
wherein the online social network is used by the unconfigured user to exchange social interaction messages with online social network friends of the unconfigured user.

15. The non-transitory computer readable medium of claim 11, wherein analyzing the search result comprises:
matching the search result to one of a plurality of pre-determined keyword lists, wherein the search result comprises textual description of the unconfigured user, and wherein the plurality of pre-determined keyword lists correspond to a plurality of business types; and
identifying the business type from the plurality of business types in response to the matching.

* * * * *